UNITED STATES PATENT OFFICE.

HAROLD HIBBERT AND HAROLD ARTHUR MORTON, OF PITTSBURGH, PENNSYLVANIA, ASSIGNORS TO UNION CARBIDE COMPANY, OF NEW YORK, N. Y., A CORPORATION OF VIRGINIA.

METHOD OF MAKING ACETALDEHYDE.

1,213,486.           Specification of Letters Patent.      Patented Jan. 23, 1917.

No Drawing.      Application filed November 5, 1915. Serial No. 59,836.

*To all whom it may concern:*

Be it known that we, HAROLD HIBBERT, a subject of the King of England, and HAROLD ARTHUR MORTON, a citizen of the United States, residing at Pittsburgh, in the county of Allegheny and State of Pennsylvania, have invented certain new and useful Improvements in Methods of Making Acetaldehyde, of which the following is a specification.

In the manufacture of acetaldehyde from acetylene, it has been proposed heretofore to pass acetylene through a solution of a mercury salt in sulfuric, phosphoric or benzene-sulfonic acid, the mercury salt serving as a catalyzer in promoting the addition of water to the acetylene with the resulting formation of acetaldehyde. In the practice of such processes, it is hightly desirable that the temperature of the bath should be sufficiently maintained so that the acetaldehyde may be continuously distilled off; but in operating at such temperatures it has heretofore been necessary, in order to avoid material production of crotonic aldehyde and other objectionable side products, to employ acid of relatively low concentration, for example below 60 grams of $SO_4$ per 1,000 grams of water.

We have found that it is practicable to employ acid of materially higher concentration than the above, while operating at a temperature sufficiently high for the continuous distillation of the acetaldehyde, and without appreciable production of crotonic aldehyde, by adding to the solution a salt or salts of a relatively weak acid. By this term we mean to include the salt of any acid, the ionization constant of which in a six-per-cent. aqueous solution is less than that of a sulfuric acid solution of the same equivalent concentration. We except chromic acid, the ionization constant of which is not known with certainty. The effect of such additions is to reduce the concentration of the hydrogen ions in the solution and thereby to render possible the employment, with its attendant advantages, of an acid solution having a materially higher concentration of $SO_4$ than has heretofore been practicable at the temperatures required for the continuous distillation of the acetaldehyde, that is to say, at temperatures above 70° C. Such salts must of course be irreducible under the operating conditions, in order that the desired effect may be maintained. Sodium borate and sodium phosphate are mentioned as illustrative examples of salts of weak acids suitable for use in accordance with this invention.

While we have in the claims instanced sulfuric acid as a typical example of a "strong" acid, it is to be understood that other acids are to be regarded as equivalent thereto, namely, any acid capable of functioning in a manner similar to sulfuric acid, and the ionization constant of which is capable of being reduced to that corresponding to a six-per cent. $SO_4$ solution by the addition of a salt of a relatively weak acid, as defined above.

An illustrative example of the process is as follows:—To 3.4 liters of a sulfuric acid solution of 10.3 per cent. concentration are added 240 grams of mercuric oxid and 120 grams of borax. The solution is maintained at a temperature of 70° to 80° C., and acetylene is introduced at the rate of about 3.7 cubic feet per hour. The production of acetaldehyde is accomplished at high efficiency (above 90 per cent.) and the product is continuously distilled from the solution and recovered by condensation. Such additions of salts of relatively weak acids may be advantageously made to solutions of strong acids other than sulfuric acid, as for instance to solutions of benzene-sulfonic acid, or of the acid sulfates of sodium or potassium: hence the invention is not limited to the employment of salts of weak acids in conjunction with a sulfuric-acid bath.

A method of making acetaldehyde from acetylene in which the acetylene is introduced into a solution of an acid salt, with or without the addition of a salt of a weak acid, is disclosed and claimed in a copending application Serial No. 59,837, filed November 5, 1915.

We claim:—

1. The method of making acetaldehyde, which consists in introducing acetylene into a solution of sulfuric acid, said solution containing also a salt of mercury and a salt of a relatively weak acid, said salt being irreducible under the operating conditions.

2. The method of making acetaldehyde, which consists in introducing acetylene into a solution of sulfuric acid, said solution containing also a salt of mercury and a salt of a relatively weak acid, said salt being irreducible under the operating conditions, and simultaneously distilling acetaldehyde from the solution.

3. The method of making acetaldehyde, which consists in introducing acetylene into a solution of sulfuric acid, said solution containing also a salt of mercury and a borate.

4. The method of making acetaldehyde, which consists in introducing acetylene into a solution of sulfuric acid, said solution containing also a salt of mercury and a borate, and simultaneously distilling acetaldehyde from the solution.

In testimony whereof, we affix our signatures in presence of two witnesses.

HAROLD HIBBERT.
HAROLD ARTHUR MORTON.

Witnesses:
S. C. PERRING,
GEO. B. NICKEL.